United States Patent [19]

Biagini et al.

[11] Patent Number: 5,627,119

[45] Date of Patent: May 6, 1997

[54] CATALYTIC SYSTEM AND PROCESS FOR THE PRODUCTION OF POYDIOLEFINS

[75] Inventors: Paolo Biagini, Trecate; Gabriele Lugli, S. Donato Milanese; Fabio Garbassi, Novara; Piero Andreussi, Milan, all of Italy

[73] Assignees: Enichem Elastomeri S.r.l., Milan; Eniricerche S.p.A., S. Donato Milanese, both of Italy

[21] Appl. No.: 383,234

[22] Filed: Feb. 3, 1995

[30] Foreign Application Priority Data

Feb. 11, 1994 [IT] Italy ................................ MI94A0241

[51] Int. Cl.⁶ ........................................................ B01J 31/14
[52] U.S. Cl. ............ 502/152; 502/102; 502/154; 502/155; 502/157; 502/170; 502/171; 502/202
[58] Field of Search ........................ 502/102, 152, 502/154, 155, 157, 170, 171, 202

[56] References Cited

U.S. PATENT DOCUMENTS

| | | | |
|---|---|---|---|
| 2,921,060 | 1/1960 | Stuart | 260/94.9 |
| 3,803,053 | 4/1974 | Yoo et al. | 252/429 B |
| 4,242,232 | 12/1980 | Sylvester et al. | 252/429 C |
| 4,619,982 | 10/1986 | Jenkins | 526/164 |
| 5,096,970 | 3/1992 | Hattori et al. | 525/268 |
| 5,272,236 | 12/1993 | Lai et al. | 526/348.5 |
| 5,347,824 | 9/1994 | Nickias et al. | 556/11 |

FOREIGN PATENT DOCUMENTS

WO93/19104  9/1993  WIPO.

OTHER PUBLICATIONS

International Polymer Science and Technology, vol. 10, No. 6, 1983, pp. T/83–T/84, N.N. Chigir, et al., "Stereospecificity of Systems Based on Organo–Neodymium Compounds and (iso–C4H9)3Al for the Polymerisation of Dienes" (No Month).

*Primary Examiner*—Shrive Beck
*Assistant Examiner*—Timothy H. Meeks
*Attorney, Agent, or Firm*—Oblon, Spivak, McClelland, Maier & Neustadt, P.C.

[57] ABSTRACT

A catalytic system to polymerize diolefinic monomers consists of a lanthanide salt, an organometallic compound of a metal belonging to groups I, II and III of the periodic table of elements and an organometallic compound of boron. The polymers obtained are characterized in that they have a high degree of 1,4 chain units and ratio between 1,4-cis/1,4-trans units which can vary as desired, and also a narrow molecular weight distribution.

14 Claims, No Drawings

CATALYTIC SYSTEM AND PROCESS FOR THE PRODUCTION OF POYDIOLEFINS

FIELD OF THE INVENTION

The present invention relates to a catalytic system obtained by the interaction of a salt of a metal belonging to the group of lanthanides, an aluminium alkyl and a trialkylic derivative of boron. The present invention also relates to the preparation of said catalytic system and its use in the polymerization of diolefins, wherein the content of 1,4-cis and 1,4-trans units of the polydiolefins obtained can vary by acting on the same catalyst.

The polydienes produced with this catalytic system are characterized in that they have a narrow molecular weight distribution [expressed as a ratio between the weight average molecular weight ($M_w$) and the number average molecular weight ($M_n$)].

A metal belonging to the group of lanthanides, as is generally accepted in the known art, means a metal belonging to the group comprising: Scandium, having an atomic number of 21; Yttrium, having an atomic number of 39; a metal having an atomic number between than of Lanthanum (57) and Lutetium (71). These metals are part of group IIIA of the periodical table, according to the IUPAC definition prior to 1985.

In addition for some of the formulae indicated in the text the following acronyms are used:

$TMA=Al(CH_3)_3$; $TEA=Al(C_2H_5)_3$; $TIBA=Al(C_4H'_9)_3$; $DIBAH=AlH(C_4H'_9)_2$; $Nd(Ver)_3$=neodymium versatate; $BPFF=B(C_6F_5)_3$.

DESCRIPTION OF THE PRIOR ART

In the known art, there are ample descriptions of catalytic systems with three components, based on derivatives of lanthanides (rare-earth), for the polymerization of butadiene having a polymer with a high 1,4-cis chain units.

For example German patents 1812935, 2011543, 2833721, 2830080, Chinese patent 85101199 and International PCT patent 93-05083, describe the preparation of polybutadiene with a high degree of 1,4-cis with the use of catalytic systems based on compounds of rare-earth and aluminium trialkyls.

In all cases the presence of a halogenating agent is essential, generally a derivative of boron having the general formula $BR_nX_{3-n}$, of aluminium having the formula $AlR_nX_{3-n}$, silicon having the general formula $SiR_nCl_{4-n}$, wherein R is an alkyl radical and X is a halogen atom such as Cl, Br or I.

The type of organometallic compound of aluminium or halogen used can influence the activity of the catalyst and the molecular weight of the final polymer but the stereospecificity is not influenced in any way.

The examples provided in the patents of the known art mentioned above indicate that the catalytic systems can be prepared both with the well-known technique "in situ" or preformed, with or without an aging period, before their use in the polymerization reaction.

Interesting examples of preformed catalytic systems with an easy industrial preparation and having a high activity are those described in European patents 201962, 201979 and 207559, wherein an alkyl halide, for example t-Butylchloride, is used as halogenating agent.

All of the documents of the known art quoted so far clearly demonstrate the production of polymers with a high degree of 1,4-cis units, starting from preformed catalytic systems, or systems prepared "in situ", comprising an aluminium trialkyl, a lanthanide salt and a halogenating agent.

The known art also describes the use of binary catalytic systems based on lanthanide salts and aluminium trialkyls. In the latter case the stereospecificity of the final polymer greatly depends on the type of lanthanide salt. In this way, by using lanthanide halides as such or in the form of complexes with alcohols, amines, organic acids or alkylphosphates, together with aluminium trialkyls, polydiolefins are obtained, which, in the case of butadiene, have chains of monomeric units of the 1,4-cis type of over 90% (typically 95–98%).

Valid examples of catalytic systems of this type are disclosed in Japanese patents 8361107 and 84113003, U.S. Pat. No. 4,575,538, German patent 243034, Chinese patent 1036962 and Russian patent 675866 respectively.

When the binary system is obtained starting from an aluminium trialkyl together with an oxygenated lanthanide salt, with the rigorous exclusion of any form of halogenating agent, either organic or inorganic, the final polymer is a polybutadiene with a high content (74–90%) of 1,4-trans units. Examples of these catalytic systems are claimed in patents EP 091287 and JP 9060907, which describe the use of binary systems based on a lanthanide carboxylate and an alkyl derivative of magnesium ($MgBut_2$) or lithium (Bu-Li) together with an aluminium trialkyl ($AlEt_3$) respectively. In both cases, apart from the use of costly components such as the alkyls of lithium or magnesium, the catalyst has a limited activity and requires long polymerization times (24 hrs) to reach industrially acceptable conversions. In addition, only plastomers with a high 1,4-trans degree can be obtained without the possibility of changing the stereospecificity of the polymer to higher values of 1,4-cis units typical of an elastomer.

The documents of the known art mentioned above clearly indicate that elastomeric polybutadienes with a high degree of 1,4-cis units can only be obtained with ternary or binary systems when halogen atoms in the form of organic or inorganic halogenating agents are present in the catalytic mixture, or starting from halogenated salts of lanthanides. Without these, only polymers with a high degree of 1,4-trans units (>75%) can be obtained and it is not possible to vary the relative percentage value of 1,4-Trans and 1,4-Cis units.

SUMMARY OF THE INVENTION

Research carried out by the Applicant has, on the other hand, surprisingly discovered a new ternary catalytic system, based on lanthanides, capable of supplying an elastomeric polybutadiene with varying values of 1,4-Cis and 1,4-Trans units as required without organic or inorganic halogenating agents, such as those indicated in the above documents; more specifically the new ternary catalytic system consists of:

(a) a lanthanide salt having the general formula $ML_3$;

(b) an aluminium alkyl having the general formula $AlR^1_3$;

(c) a derivative of boron having the general formula $BR^2_{3-m}(C_6H_{5-n}R^3_n)_m$, the meaning of M, L, $R^1$, $R^2$ and $R^3$ being explained in detail below.

The catalytic system is formed when the three components are reacted in suitable molar ratios and under suitable experimental conditions, as will be better illustrated hereafter.

In accordance with what is specified above, a first aspect of the present invention relates to a catalytic system for the polymerization of dienic monomers, basically consisting of:

(A) a salt having the general formula $$ML_3$$

wherein M represents a metal such as Sc, Y or a metal with an atomic number of between 57 and 71 and L a general anionic binder with the sole exclusion of halogen binders, (B) an alkyl, hydride or alkyl-hydride compound having general formula $$MeR^1_z$$

wherein,

Me is a metal belonging to groups I, II or III of the periodic table;

$R^1$ is:
- an aliphatic or cycloaliphatic radical containing from 1 to 20 carbon atoms,
- an aromatic radical containing from 6 to 20 carbon atoms,
- a hydrogen atom, z is an integer from 1 to 3 equal to the value of Me, on condition that, if z is equal to 3, only one of the three $R^1$ groups bound to the metal can be hydrogen, (C) an organometallic derivative of boron having general formula $$BR^2{}_{3-m}(C_6H_{5-n}R^3{}_n)_m$$

wherein, $R^2$ is an aliphatic radical, linear or branched, containing from 1 to 20 carbon atoms; a cycloaliphatic group containing from 6 to 20 carbon atoms; an aromatic group containing from 6 to 20 carbon atoms, $R^3$ is a fluorine atom or $CF_3$ group;

m is an integer between 1 and 3 n is an integer between 1 and 5.

As mentioned briefly above, component (A) of the catalytic system, having general formula $ML_3$, consists of an Sc, Y or lanthanide salt with an atomic number of between 57 and 71.

Although the catalytic system claimed is absolutely general, for various reasons, with respect to availability, commercial price and catalytic activity, as well as the characteristics of the final polymer, the salts having general formula $ML_3$ where M is Nd, Pr, Dy, La, Gd and Y are preferred.

The binder L is a general anionic binder with the only condition that it is not halogen. Bearing in mind what is specified above, valid, non-restrictive examples of salts of the metals claimed above are carboxylates such as naphthenate, versatate, pivalate, 2-ethylhexanoate, formiate, acetate, trifluoroacetate; alkoxides such as methylate, butylate, ter-butylate; phenolates; thioalkoxides; dialkylamides; bis-trimethylsilylamides; acetylacetonates and hexafluoroacetylacetonates.

Component (B) of the catalytic system is represented by a hydride, alkyl or mixed derivative of a metal belonging to groups I, II or III of the periodic table of elements. Valid but non-restrictive examples of this compound can be: lithium hydride, lithium-aluminium hydride, lithium butyl, lithium sec-butyl, sodium hydride, magnesium hydride, magnesium dibutyl, aluminium trimethyl, aluminium triethyl, aluminium triisobutyl, aluminium diisobutyl-monohydride, aluminium trioctyl, gallium trimethyl, gallium triethyl. For reasons of solubility, industrial availability and price, the alkyl derivatives of aluminium such as aluminium trimethyl (TMA), aluminium triethyl (TEA), aluminium triisobutyl (TIBA) and aluminium diisobutylmonohydride (DIBAH) are preferred.

Component (C) of the catalytic system consists of an organometallic derivative of boron having the general formula $$BR^2{}_{3-m}(C_6H_{5-n}R^3{}_n)_m$$

wherein $R^2$ is an aliphatic radical, linear or branched containing from 1 to 20 carbon atoms; a cycloaliphatic group containing from 6 to 20 carbon atoms; an aromatic group containing from 6 to 20 carbon atoms;

$R^3$ is a fluorine atom or $CF_3$ group;

m is an integer between 1 and 3;

n is an integer between 1 and 5.

Non-limiting examples of this group of derivatives are: $B(C_6F_5)_3$, $B(CH_3)(C_6F_5)_2$, $B(C_2H_5)(C_6F_5)_2$, $B(C_6H_4F)_3$, $B(C_6H_3F_2)_3$, $B(C_6H_2F_3)_3$, $B[C_6H_3(CF_3)_2]_3$, $B[C_6H_2(CF_3)_3]_3$, $B(C_2H_5)[C_6H_3(CF_3)_2]_2$.

As specified above, the catalytic system of the present invention is prepared by mixing in suitable ratios components (A), (B) and (C), previously described, in an aliphatic, cycloaliphatic or aromatic solvent or their mixtures. This preparation can be carried out either with "in situ" or with preformation techniques.

In the former case, the preparation of the catalytic system is carried out by adding, in order, component (B), the monomer to be polymerized, component (A), and, last of all, component (C), to the solvent, obtaining a limpid solution and the polymerization is carried out in a homogeneous phase. The order of introducing the monomer, component (A) and component (B) is not binding whereas, as far as component (C) is concerned, the best results are obtained by adding this as last.

In the latter case, the preformation of the catalytic system is carried out by reacting components (A), (B) and (C), in the order mentioned above, in the desired solvent, for a period of 0.5–24 hours at temperatures of between 0° and 80° C. in the presence of or without small quantities of the diolefin to be polymerized. Aliphatic, cycloaliphatic or aromatic hydrocarbons can be used in the preformation reaction. The use of an aromatic solvent gives a homogeneous solution, whereas the use of an aliphatic solvent produces a partial formation of solid precipitate. The formation of the precipitate however does not negatively influence the catalytic activity as the precipitate formed during the preformation of the catalyst redissolves in the polymerization environment forming a homogeneous phase.

Experimental work has shown that the best preformation conditions are obtained by carrying out the reaction between (A), (B) and (C) in toluol, in the order specified above, at 50° C. for 1 hour in the presence of or without less than 1 g of butadiene per $1\times10^{-3}$ moles of component (A).

In the formation of the catalytic system, the molar ratios in which components (A), (B) and (C) are reacted, are of considerable importance. Research carried out by the applicant has shown that the molar ratio (B)/(A) can vary between 3 and 100 and, preferably, between 8 and 20. Values higher than 100, although they can be used, are not advisable as they do not provide any improvements in the catalytic process and the cost increases due to component (B). The molar ratio (C)/(A) can vary between 0.1 and 50 but values between 1 and 3 are preferred.

As already mentioned, a further aspect of the present invention relates to the use of the catalytic system described above in a polymerization process of conjugated diolefins, (for example butadiene), this process being characterized by a high polymerization rate and by the production, with high yields, of a polybutadiene with a varying degree of 1,4-cis and 1,4-trans units, controllable molecular weights and a narrow molecular weight distribution. More specifically, the resulting polymer of this process has percentage values of 1,4-cis and 1,4-trans units which vary from 35/63 to 98/1 respectively, whereas the percentage value of 1,2 units is generally between 0.5 and 2. In addition, the value of the weight average molecular weight (Mw) can vary between $50\times10^3$ and $1\times10^8$ and the ratio between the weight average molecular weight (Mw) and the number average molecular weight (Mn) is between 1.5 and 2.6.

It can be easily confirmed that all the alkyl derivatives generate, together with compounds (A) and (C), a highly active catalytic system in the polymerization of high polymer diolefins with a 1,4 chain units of more than 98%. Research carried out by the Applicant has shown however that the nature of component (B) has a determining influence on the composition of the final polymer. Consequently the use of TMA produces a final polymer having a percentage of 1,4-cis/1,4-trans units of about 30/70 respectively whereas the use of TIBA produces a polymer with a 98/1 ratio of the same units. The catalysts prepared with TEA and DIBAH produce polymers having intermediate ratio values between the 1,4-cis and 1,4-trans units.

Other differences have been verified depending on the nature of compound (B) and relating to the activity of the catalytic system and value of final molecular weights of the polymer. It is well-known to experts in the field, however, that in a Ziegler-Natta type polymerization, these characteristics often depend on the nature of the alkyl derivatives used for the preparation of the catalytic system and there are plenty of examples in the known art in this respect.

Even if the catalytic system claimed by the applicant is active in the polymerization of unsaturated hydrocarbon derivatives, in particular, diolefins such as 1,3-butadiene, isoprene, 1,3-pentadiene, 2,3-dimethylbutadiene, the monomer preferably used is 1,3-butadiene as the polymers of this monomer are products which are the most widely used industrially.

The activity of the catalytic system depends on the nature of components (A) and (B) used and on the formation method of the catalytic system. Alkoxide derivatives therefore prove to be generally more active than carboxylate derivatives and TIBA has a similar activity to DIBAH and both are better than TMA. In general, with all the aluminium alkyls, the best activity has been obtained by preforming the catalytic system in the presence of or without small quantities of monomer and aging for 1 hour at a temperature of 50° C. A particularly interesting fact is that the activity of preformed catalytic systems, in the presence of or without monomer, remains high even after conservation periods of the catalytic system of several weeks.

The polymerization reaction is carried out indifferently in an aliphatic solvent, n-hexane or a $C_6$ petroleum cutting with a boiling point of between 64° and 68° C., or in an aromatic solvent, toluene. An interesting characteristic of the catalytic system claimed in the present invention is its high activity in polymerization with the double advantage of minimizing the cost of the catalytic system and the quantity of impurities which remain in the polymer after its recovery. In fact, activities equal to $5-10\times10^{-4}$ moles of component (A) per Kg of diolefin polymerized are obtained with reaction times of between 0.5 and 2 hours at temperatures of between 0° and 100° C.

A further aspect of the present invention relates to the polymer obtained using the above catalytic system. It consists of polybutadiene with a high 1,4 chain units content in which it is possible to vary the ratio between the 1,4-cis and 1,4-trans type units from 30/70 to 98/1 depending on the type of component (B) used. These variable cis-trans polymers form an interesting class of materials ranging from elastomers which are crystallizable under stretch, those with 1,4-Cis units >95%, to completely amorphous elastomers at room temperature, with 50% in 1,4-trans units.

A common characteristic of the whole group of polymers obtained with the catalytic system claimed, and this is a further aspect of the present invention, is the low value of molecular weight distribution of the polymers intended as a ratio between the weight average molecular weight and the number average molecular weight (Mw/Mn), of between 1.5 and 2.6.

This narrow distribution ensures that there are no high or low molecular weight fringes in the polymer which are always present when the Mw/Mn distribution exceeds the value of 3. In this respect, the polymerization carried out at 0° C. is to be particularly interesting, as in this case high molecular weights and a molecular weight distribution (Mw/Mn) of 1.6 are obtained.

Another interesting characteristic of the polymers produced according to the present invention is the lack of any type of gel (micro or macro gel) which is often present in polybutadiene with a high 1,4-Cis chain units with a weight average molecular weight higher than $500\times10^3$.

Following this general description of the catalytic system and polymerization process of the present invention, detailed examples of the preparation of the catalyst, polymerization reaction and polymer obtained, are given below. These examples, which are not limiting, describe the experimental operations in order to provide a better understanding of the invention itself.

Example 1

Preparation of the Preformed Catalyst

Procedure A. 20 cm³ of toluene, $1.65\times10^{-3}$ moles of component (A) and $29.7\times10^{-3}$ moles of component (B) are introduced in an inert atmosphere into a 100 cm³ graded test-tube, equipped with a lateral tap for the nitrogen flow and a magnetic anchor. The mixture is left under stirring until the solid has completely dissolved and $4.95\times10^{-3}$ moles of component (C) are then added. Using the graded scale of the test-tube, the final volume is brought to 50 cm³ with toluene and the mixture is left to age at room temperature under stirring for the desired time. The solution of preformed catalyst thus obtained, which contains $3\times10^{-3}$ gAtoms/cm³ of metal of component (A), is used for the polymerization tests.

Procedure B. Following the procedure of process A, a toluene solution of catalyst is prepared by introducing, in order, $0.9\times10^{-3}$ moles of component (A), $16.2\times10^{-3}$ moles of component (B) and $2.7\times10^{-3}$ moles of component (C). The solution is brought to 30 cm³ with toluene and is maintained at 50° C. for 1 h, under stirring. The concentration proves to be $3\times10^{-3}$ gAtoms/cm³ of metal of component (A).

Procedure C. 20 cm³ of toluene, $1.15\times10^{-3}$ moles of component (A) and $20.7\times10^{-3}$ moles of component (B) are introduced in an inert atmosphere into a 100 cm$^3$ graded test-tube, equipped with a lateral tap for the nitrogen flow and a magnetic anchor. The mixture is left under stirring until the solid has completely dissolved and 1.2 g of liquid butadiene and 3.4×10$^{-3}$ moles of component (C) are then added, in order. Using the graded scale of the test-tube, the final volume is brought to 38 cm$^3$ with toluene and the preformation reaction is carried out under stirring and at room temperature for the desired time. The final solution of preformed catalyst thus obtained, which contains 3×10$^{-3}$ gAtoms/cm$^3$ of metal of component (A), is used for the polymerization tests.

Procedure D. Following the procedure of process A, a toluene solution of catalyst is prepared by introducing, in order, 25 cm$^3$ of toluene, 1.3×10$^3$ moles of component (A), 23.4×10$^3$ moles of component (B), 1.4 g of liquid butadiene and 3.9×10$^{-3}$ moles of component (C). The solution is brought to 43 cm$^3$ with toluene and is maintained at 50° C. for 1 h, under stirring. The concentration proves to be 3×10$^{-3}$ gAtoms/cm$^3$ of metal of component (A).

Example 2

The polymerization of butadiene is described using a catalyst prepared in the presence of a monomer and without aging ("in situ" preparation).

A 200 cm$^3$ drinking bottle, previously heated in a muffle furnace at 140° C., is cooled to room temperature under a perfectly dry nitrogen flow, to eliminate the environmental air and humidity. The following products are charged into the bottle which is maintained under a nitrogen atmosphere and immersed in a bath at 0° C.: 150 cm$^3$ of anhydrous hexane, 20 g of anhydrous butadiene liquid removed from an overturned cylinder with a hypodermic syringe sealed to the cylinder valve, 1 cm$^3$ of a hexane solution containing 3×10$^{-5}$ moles/cm$^3$ of Nd(Obu)$_3$, 0.54 cm$^3$ of a 1 molar solution of Al(C$_4$H$_9^i$)$_3$ and 0.18 cm$^3$ of an 0.5 molar solution of B(C$_6$F$_5$)$_3$. The bottle is then closed with a crowned top equipped with a teflon seal, placed in a bath at 50° C. and magnetically stirred for 4 hrs. The bottle is then rapidly cooled in a bath at 0° C., opened and the contents poured in about 300 cm$^3$ of methanol containing 0.5 g of a suitable antioxidant. The coagulated polymer is collected, washed three times with methanol and then dried in a vacuum oven heated to 60° C. obtaining 19 g (95% conversion) of dry polymer whose structure, upon IR analysis, proves to be 92% 1,4-cis, 7% 1,4-trans, 1.0% 1,2. Gel Permeation Chromatography analysis shows that the polymer has a Mw of 200×10$^3$ and Mw/Mn=2.

Examples 3–6

The influence of the type of component (B) on the stereospecificity of the polymer obtained is shown. Following the operating procedure, the concentrations and molar ratios indicated in example 2, four catalysts are prepared with the "in situ" technique, using Nd(OBu)$_3$ as component (A) and BPFF as component (C). The type of component (B) used, the polymerization conditions and results obtained are shown in table 1.

Example 7

Butadiene is polymerized using a preformed catalyst.

A 200 cm$^3$ drinking bottle, previously heated in a muffle furnace at 140° C., is cooled to room temperature under a perfectly dry nitrogen flow, to eliminate the environmental air and humidity. The following products are charged into the bottle which is maintained under a nitrogen atmosphere and immersed in a bath at 0° C.: 150 cm$^3$ of anhydrous hexane and 20 g of anhydrous butadiene. To this solution, 1 cm$^3$ is added of a solution containing 3×10$^{-3}$ gAtom of neodymium, preformed catalyst prepared with the procedure indicated in example 1 Procedure A using 1.1×10$^{-3}$ moles of Nd(Ver)$_3$, 19.8×10$^{-3}$ moles of TIBA and 3.3×10$^{-3}$ moles of BPFF and preforming at room temperature for 24 hrs. The bottle is then closed with a crowned top equipped with a teflon seal, placed in a bath at 50° C. and magnetically stirred for 1 h. After this period, the bottle is then rapidly cooled in a bath at 0° C., opened and the contents poured in about 300 cm$^{-3}$ of methanol containing 0.5 g of a suitable antioxidant. The coagulated polymer is collected, washed three times with methanol and then dried in a vacuum oven heated to 60° C. obtaining 18.6 g (93% conversion) of dry polymer whose structure, upon IR analysis, proves to be 96% 1,4-cis, 3% 1,4-trans, 1.0% 1,2. Gel Permeation Chromatography analysis shows that the polymer has a Mw of 482×10$^3$ and Mw/Mn=2.

Example 8

Following the operating procedure described in example 2, a catalyst is prepared "in situ" by charging into a drinking bottle 150 cm$^3$ of hexane, 24 g of butadiene, 1 cm$^3$ of a hexane solution containing 7×10$^{-3}$ moles/cm$^3$ of Nd(Ver)$_3$, 1.3 cm$^3$ of a 1 molar solution of AlH(C$_4$H$_9^i$)$_2$ and 0.42 cm$^3$ of an 0.5 molar solution of B(C$_6$F$_5$)$_3$. The polymerization is carried out for 4 hrs at 50° C. obtaining 18 g (75%) of polymer with the following analyses: 64% 1,4-cis; 34% 1,4-trans; 2% 1,2; Mw=200×10$^3$; Mw/Mn=2.6.

Example 9

A preformed catalyst is prepared according to the procedure described in example 1 Procedure A using as components of the catalytic system 0.7×10$^{-3}$ moles of Nd(Ver)$_3$, 12.6×10$^{-3}$ moles of TMA, 2.1×10$^{-3}$ moles of BPFF and preforming for 1 hr at 50° C. Following the method indicated in example 7, 1 cm$^3$ of the catalyst solution previously prepared is added to 20 g of butadiene in 150 cm$^3$ of hexane, the polymerization being carried out at 50° C. for 1 hr. 9.0 g (45%) of dry polymer are obtained, whose structure, upon IR analysis, proves to be 32% 1,4-cis, 67% 1,4-trans, 1.0% 1,2. Gel Permeation Chromatography analysis shows that the polymer has a Mw of 332×10$^3$ and Mw/Mn=2.4.

Example 10

Following the operating procedure described in example 2, a catalyst is prepared "in situ" by charging into a drinking bottle 150 cm$^3$ of hexane, 20 g of butadiene, 1 cm$^3$ of a hexane solution containing 3×10$^{-3}$ moles/cm$^3$ of Pr(OBu)$_3$, 0.54 cm$^3$ of a 1 molar solution of Al(CH$_3$)$_3$ and 0.18 cm$^3$ of an 0.5 molar solution of B(C$_6$F$_5$)$_3$. The polymerization is carried out for 4 hrs at 50° C. 14.4 g (72%) of polymer are recovered.

Examples 11–17

Three preformed catalysts are prepared by reacting, according to the procedure and ratios indicated in example 1 Procedures A and B, Nd(OBu)$_3$ or Pr(OBu)$_3$, as components (A), with aluminium trialkyl, as component (B), and BPFF, as component (C). The polymerization tests carried out as in example 7, show how the preformation technique considerably increases the catalyst activity and this activity remains even for long preformation periods. Components (A) and (B) used, the temperatures and preformation times, the yields and characteristics of the polymers are shown in table 2.

Examples 18–22

Four preformed catalysts are prepared starting from Nd(OBu)$_3$ as component (A), TIBA as component (B) and BPFF as component (C). The preformation is carried out according to the procedure described in example 1 Process C and D. The polymerization reactions were carried out as illustrated in example 7 and show how preformation in the presence of small quantities of monomer to be polymerized considerably increases the catalyst activity and this activity remains even for long preformation periods without great variations in the characteristics of the polymer. The temperatures and preformation times, the polymerization conditions and results obtained are shown in table 3.

Examples 23–28

Two preformed catalytic systems are prepared starting from Nd(Ver)$_3$ as component (A), TMA and TIBA as components (B) and BPFF as component (C). The catalytic systems are preformed, according to the procedure indicated in example 1 Procedures C and D, at room temperature for 24 hrs. The polymerization tests, carried out as indicated in example 7, show the influence of the polymerization temperature on the molecular weights of the polymers produced. The polymerization temperatures and results obtained are shown in table 4.

TABLE 1

| Ex.* nr. | Compo-nent (B) | Conver-sion % | Infrared Analysis (%) | | | Mw × $10^{-3}$ | Mw/Mn |
|---|---|---|---|---|---|---|---|
| | | | 1,4 cis | 1,4 trans | 1,2 | | |
| 3 | TMA | 98 | 92 | 7 | 1 | 200 | 2.0 |
| 4 | " | 93 | 80 | 19 | 1 | 322 | 2.6 |
| 5 | " | 85 | 59 | 40 | 1 | 130 | 2.6 |
| 6 | TIBA | 86 | 42 | 57 | 1 | 429 | 2.4 |

(*) Solvent hexane cm$^3$ 150; Nd (OBu)$_3$ 3 × 10$^{-5}$ moles; Component (B) 5.4 × 10$^{-4}$ moles; BPFF 9 × 10$^{-5}$ moles; Butadiene g 20; Polymerization temperature 50° C.; Time 4 hrs.

TABLE 2

| Example* nr. | Component | | Preformation | | |
|---|---|---|---|---|---|
| | (A) | (B) | Time (hrs.) | T (°C.) | Yield % |
| 11** | Nd(OBu)$_3$ | TIBA | — | — | 35 |
| 12 | " | " | 1 | room | 46 |
| 13 | " | " | 24 | room | 95 |
| 14 | " | " | 168 | room | 93 |
| 15 | " | TMA | 24 | room | 84 |
| 16 | Pr(OBu)$_3$ | TIBA | 1 | 50 | 80 |
| 17 | Nd(OBu)$_3$ | " | 1 | 50 | 97 |

(*) Solvent hexane cm$^3$ 150; 1 cm$^3$ of solution of preformed catalyst equal to 3 × 10$^{-5}$ gAtom of Lanthanide; Butadiene g 20; Polymerization temperature 50° C.; Polymerization time 1 hr.

(**) Test "in situ" as in example 2.

TABLE 3

| Ex.* nr. | Preformation | | Polimer-ization | | Infrared Analysis (%) | | | Mw × $10^{-3}$ | Mw/Mn |
|---|---|---|---|---|---|---|---|---|---|
| | t (h) | T (°C.) | T (°C.) | Yield % | 1,4 cis | 1,4 trans | 1,2 | | |
| 18** | — | — | 50 | 35 | 90 | 9 | 1 | 120 | 2.4 |
| 19 | 1 | room | " | 60 | 94 | 5 | 1 | 250 | 2.1 |
| 20 | 24 | " | " | 80 | 92 | 7 | 1 | 390 | 2.2 |
| 21 | 120 | " | " | 93 | 92 | 7 | 1 | 450 | 2.2 |
| 22 | 1 | 50 | " | 80 | nd | nd | nd | nd | nd |

(*) Solvent hexane cm$^3$ 150; 1 cm$^3$ of solution of preformed catalyst equal to 3 × 10$^{-5}$ gAtom of Neodimium; Butadiene g 20; Polymerization time 1 hr.

(**) Test "in situ" as in example 11.

TABLE 4

| Ex.* nr. | Component (B) | Polimerization | | | Infrared Analysis (%) | | | Mw × $10^{-3}$ | Mw/Mn |
|---|---|---|---|---|---|---|---|---|---|
| | | T (°C.) | t (hrs.) | Yield % | 1,4 cis | 1,4 trans | 1,2 | | |
| 23 | TMA | 0 | 15 | 70 | 37 | 62 | 1 | 700 | 1.8 |
| 24 | " | 30 | 3 | 90 | 39 | 60 | 1 | 490 | 1.7 |
| 25 | " | 50 | 1 | 84 | 40 | 59 | 1 | 350 | 2.1 |
| 26 | TIBA | 0 | 3 | 95 | 98 | 1 | 1 | 750 | 1.6 |
| 27 | " | 30 | 1 | 98 | 92 | 7 | 1 | 509 | 1.7 |
| 28 | " | 80 | 1 | 90 | 77 | 21 | 1 | 300 | 2.6 |

(*) Solvent hexane cm$^3$ 150; 1 cm$^3$ of solution of preformed catalyst equal to 3 × 10$^{-5}$ gAtom of Neodimium; Butadiene g 20.

We claim:

1. Catalytic system for the polymerization of dienic monomers, consisting essentially of:

(A) a salt having the formula $$ML_3$$

wherein M represents Sc or Y or a metal with an atomic number between 57 and 71, and L is an anion with the sole exclusion of halogen.

(B) an alkyl, hydride or alkyl-hydride compound having the formula $$MeR^1_z$$

wherein,

Me is a metal belonging to group I, II or III of the periodic table;

$R^1$ is:
- an aliphatic or cycloaliphatic radical containing from 1 to 20 carbon atoms,
- an aromatic radical containing from 6 to 20 carbon atoms, or
- a hydrogen atom, z is an integer from 1 to 3 equal to the valence of Me, on condition that, if z is equal to 3, only one of the three $R^1$ groups bound to the metal can be hydrogen.

(C) an organometallic derivative of boron having the formula $$BR^2_{3-m}(C_6H_{5-n}R^3_n)_m$$

wherein, $R^2$ is an aliphatic radical, linear or branched, containing from 1 to 20 carbon atoms; a cycloaliphatic group containing from 6 to 20 carbon atoms; or an aromatic group containing from 6 to 20 carbon atoms, $R^3$ is a fluorine atom or $CF_3$ group;

m is an integer from 1 to 3 n is an integer from 1 to 5.

2. Catalytic system according to claim 1, wherein M represents Nd, Pr, Dy, La, Gd or Y.

3. Catalytic system according to claim 1, wherein the anion L is a carboxylate.

4. Catalytic system according to claim 3, wherein the anion L is a naphthenate, versatate, pivalate, 2-ethylhexanoate, formiate, acetate or trifluoroacetate.

5. Catalytic system according to claim 1, wherein the anion L is an alkoxide.

6. Catalytic system according to claim 5, wherein the anion L is a methylate, butylate, ter-butylate or isopropylate.

7. Catalytic system according to claim 1, wherein the anion L is a phenolate, a thioalkoxide, a dialkylamide, a bistrimethylsilyl-amide, an acetylacetonate or a hexafluoroacetylacetonate.

8. Catalytic system according to claim 1, wherein the organometallic compound (B) is: lithium hydride, lithium butyl, lithium sec-butyl, sodium hydride, magnesium hydride, magnesium dibutyl, aluminum trimethyl, aluminum triethyl, aluminum triisobutyl, aluminum diisobutyl-monohydride, aluminum trioctyl, gallium trimethyl or gallium triethyl.

9. Catalytic system according to claim 8, wherein the organometallic compound (B) is aluminum trimethyl, aluminum triethyl, aluminum triisobutyl or aluminum diisobutyl-monohydride.

10. Catalytic system according to claim 1, wherein the compound (C) is $B(C_6F_5)_3$, $B(CH_3)(C_6F_5)_2$, $B(C_2H_5)(C_6F_5)_2$, $B(C_6H_4F)_3$, $B(C_6H_3F_2)_3$, $B(C_6H_2F_3)_3$, $B[C_6H_3(CF_3)_2]_3$, $B[C_6H_2(CF_3)_3]_5$ or $B(C_2H_5)[C_6H_3(CF_3)_2]_2$.

11. Method for the preparation of a catalytic system for the polymerization of dienic monomers, consisting essentially of:

(A) a salt having the formula $$ML_3$$

wherein M represents Sc or Y or a metal with an atomic number between 57 and 71, and L is an anion with the sole exclusion of halogen.

(B) an alkyl, hydride or alkyl-hydride compound having the formula $$MeR^1_z$$

wherein,

Me is a metal belonging to group I, II or III of the periodic table;

$R^1$ is:
- an aliphatic or cycloaliphatic radical containing from 1 to 20 carbon atoms,
- an aromatic radical containing from 6 to 20 carbon atoms, or
- a hydrogen atom, z is an integer from 1 to 3 equal to the valence of Me, on condition that, if z is equal to 3, only one of the three $R^1$ groups bound to the metal can be hydrogen.

(C) an organometallic derivative of boron having formula $$BR^2_{3-m}(C_6H_{5-n}R^3_n)_m$$

wherein, $R^2$ is an aliphatic radical, linear or branched, containing from 1 to 20 carbon atoms; a cycloaliphatic group containing from 6 to 20 carbon atoms; or an aromatic group containing from 6 to 20 carbon atoms, $R^3$ is a fluorine atom or $CF_3$ group;

m is an integer from 1 to 3 n is an integer from 1 to 5, comprising mixing in the following order: component (B), the monomer to be polymerized, component (A), and, last of all, component (C), in an aliphatic, cycloaliphatic, aromatic solvent or their mixtures.

12. Method for the preparation of a catalytic system for the polymerization of dienic monomers, consisting essentially of:

(A) a salt having the formula
$$ML_3$$

wherein M represents Sc or Y or a metal with an atomic number between 57 and 71, and L is an anion with the sole exclusion of halogen.

(B) an alkyl, hydride or alkyl-hydride compound having the formula $$MeR^1_z$$

wherein,

Me is a metal belonging to group I, II or III of the periodic table;

R$^1$ is:
- an aliphatic or cycloaliphatic radical containing from 1 to 20 carbon atoms,
- an aromatic radical containing from 6 to 20 carbon atoms, or
- a hydrogen atom.

z is an integer from 1 to 3 equal to the valence of Me, on condition that, if z is equal to 3, only one of the three R$^1$ groups bound to the metal can be hydrogen, (C) an organometallic derivative of boron having formula $$BR^2{}_{3-m}(C_6H_{5-n}R^3{}_n)_m$$

wherein,
- R$^2$ is an aliphatic radical, linear or branched, containing from 1 to 20 carbon atoms; a cycloaliphatic group containing from 6 to 20 carbon atoms; or an aromatic group containing from 6 to 20 carbon atoms,
- R$^3$ is a fluorine atom or CF$_3$ group;
- m is an integer from 1 to 3
- n is an integer from 1 to 5, comprising mixing components (A), (B) and (C) in an aliphatic, cycloaliphatic, aromatic solvent or their mixtures.

13. Method for the preparation of a catalytic system, for the polymerization of dienic monomers, consisting essentially of:

(A) a salt having the formula $$ML_3$$

wherein M represents Sc or Y or a metal with an atomic number between 57 and 71, and L is an anion with the sole exclusion of halogen, (B) an alkyl, hydride or alkyl-hydride compound having the formula $$MeR^1{}_z$$

wherein,

Me is a metal belonging to group I, II or III of the periodic table;

R$^1$ is:
- an aliphatic or cycloaliphatic radical containing from 1 to 20 carbon atoms,
- an aromatic radical containing from 6 to 20 carbon atoms, or
- a hydrogen atom.

z is an integer from 1 to 3 equal to the valence of Me, on condition that, if z is equal to 3, only one of the three R$^1$ groups bound to the metal can be hydrogen, (C) an organometallic derivative of boron having formula $$BR^2{}_{3-m}(C_6H_{5-n}R^3{}_n)_m$$

wherein,
- R$^2$ is an aliphatic radical, linear or branched, containing from 1 to 20 carbon atoms; a cycloaliphatic group containing from 6 to 20 carbon atoms; or an aromatic group containing from 6 to 20 carbon atoms,
- R$^3$ is a fluorine atom or CF$_3$ group;
- m is an integer from 1 to 3
- n is an integer from 1 to 5, comprising mixing components (A), (B) and (C) for a period of 0.5–24 hours at temperatures of between 0° and 80° C. in the presence of or without small quantities of diolefin.

14. Method for the preparation of the catalytic system according to claim 13, wherein components (A), (B) and (C) are mixed in toluene at 50° C. for 1 hour in the presence of 1 g of butadiene per 1×10−3 moles of component (A).

* * * * *

UNITED STATES PATENT AND TRADEMARK OFFICE
CERTIFICATE OF CORRECTION

PATENT NO. : 5,627,119
DATED : May 6, 1997
INVENTOR(S) : Paolo BIAGINI, et al.

It is certified that error appears in the above-indentified patent and that said Letters Patent is hereby corrected as shown below:

On the title page, item [54] and column 1, lines 1-2 the title should read as follows:

--CATALYTIC SYSTEM AND PROCESS FOR THE PRODUCTION OF POLYDIOLEFINS--

On the title page, item [73], the first assignee's name should read:

--Enichem Elastomeri S.r.l.--

Signed and Sealed this

Second Day of September, 1997

*Attest:*

BRUCE LEHMAN

*Attesting Officer*  Commissioner of Patents and Trademarks